United States Patent [19]

Billiet et al.

[11] Patent Number: 4,786,298
[45] Date of Patent: Nov. 22, 1988

[54] FILTER ASSEMBLY

[75] Inventors: Colin T. Billiet, Durham; David Baggett, Newcastle-upon-Tyne; Alan Bateman, Biddick Washington, all of England

[73] Assignee: Domnick Hunter Filters Limited, Birtley, England

[21] Appl. No.: 98,291

[22] Filed: Sep. 18, 1987

[30] Foreign Application Priority Data

Sep. 20, 1986 [GB] United Kingdom ............... 8622706

[51] Int. Cl.⁴ ............................................. B01D 50/00
[52] U.S. Cl. ........................................ 55/269; 55/275; 55/316; 55/387; 55/498; 55/502
[58] Field of Search ............................ 55/267–269, 55/274, 275, 316, 487, 498, 387, DIG. 17, DIG. 34

[56] References Cited

U.S. PATENT DOCUMENTS

| 3,154,487 | 10/1964 | Thornton et al. | 210/446 |
| 3,841,484 | 10/1974 | Domnick | 55/274 |
| 4,396,206 | 8/1983 | Tsuge et al. | 55/316 |

Primary Examiner—Bernard Nozick
Attorney, Agent, or Firm—Henry Sternberg; Bert J. Lewen

[57] ABSTRACT

A filter assembly (1) comprises a fluid tight housing (6, 7). First and second coupling means (10 and 11) are provided on the housing, each coupling means providing adjacent flow channels into the housing. A filter element is located within the housing, the element having a fluid tight external wall (20) and a filter medium (19) housed within the wall. A first flow path is established between the first and second coupling means through the filter element, while a second flow path between the first and second coupling means is established within the housing but outside the external wall of the filter element.

9 Claims, 2 Drawing Sheets

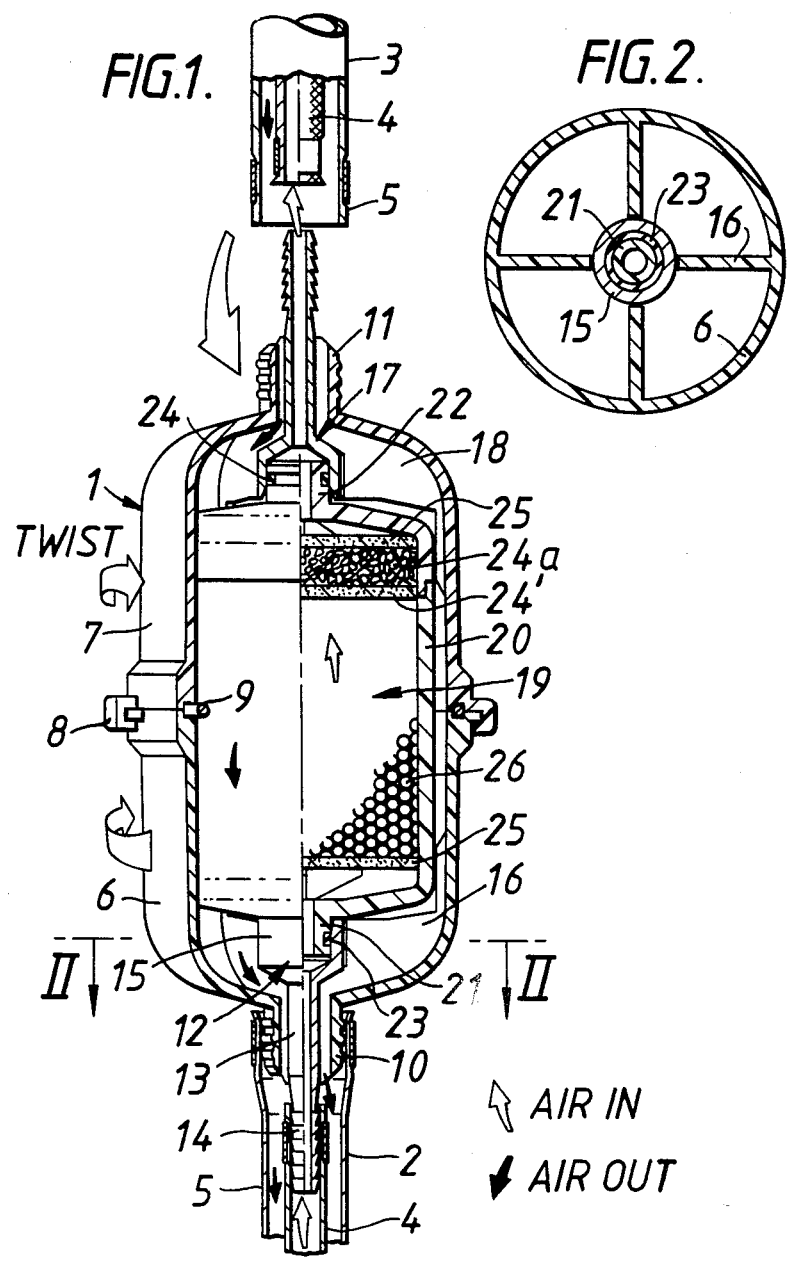

FILTER ASSEMBLY

This invention relates to filter assemblies.

Filter assemblies that are designed to remove contaminants from a flow of gas can conveniently be grouped into two categories. In the first category a filter element is provided that contains material for effecting the required filtration, and the gas flow is simply passed directly into an entry port of the filter element, and leaves the element by way of an exit port, the element being connected appropriately in the gas line. In the second category a filter element is mounted in a housing that is provided with gas inlet and outlet ports, and the gas either enters the housing through an inlet port, passes from free space within the housing into and through the filter element and leaves the filter element via the outlet port, or enters the filter element through the inlet port, passes through the filter element into free space within the housing and leaves the housing by way of the outlet port. In either such embodiment there is sequential flow of the gas through the filter element and through free space around the filter element and within the housing.

Filters of one or other of these categories can readily be used in most gas filtration applications. There is, however, a range of applications where there is a requirement for gas to be supplied from outside an enclosure to an instrument to be used within the enclosure, and for the gas which has passed through the instrument to be exhausted externally of the enclosure. An example of such enclosure is an operating theatre, where a supply of compressed air is used to drive surgical cutters or other instruments, but it is essential that the air leaving the instrument is exhausted externally of the operating theatre. It is possible to meet this requirement by having an input air hose running from the enclosure wall to the instrument and a separate output air hose running back from the instrument to the enclosure wall. Either of the known category of filter could then be incorporated in the input air hose. However, it is obviously advantageous, and has become customary, to use a single air hose, which is divided internally to provide an inlet air passage and an outlet air passage, the two passages commonly being coaxial. With this arrangement there is no simple and effective way in which a known category of filter may be incorporated into the air inlet section of the hose, and attempted use of any such filter will inevitably require junctions and by-pass lines for the outlet air flow. This entails a more cumbersome filter arrangement, and in the particular environment of operating theatres creates additional irregular surfaces on which bacteria and other contaminants can accumulate. The invention seeks to provide a filter assembly of simple construction that can be used in a divided flow gas line and which avoids the disadvantages referred to.

According to the invention a filter assembly comprises a fluid-tight housing, a first coupling means on the housing providing first and second adjacent flow channels into the housing, a second coupling means on the housing providing third and fourth adjacent flow channels into the housing, and a filter element located within the housing, the filter element having a fluid-tight external wall, the assembly being such that a first flow path is established between the first and third flow channels through a filter medium housed within the interior of the filter element, and a second flow path wholly separate from the first flow path is established between the second and fourth flow channels within the housing but outside the external wall of the filter element.

It will readily be seen that such an assembly can be coupled into a divided flow gas line so that the input flow is directed through the filter element and the outlet flow passes around the outside of the filter element but within the housing. The input and output flows are completely separate within the housing, and the only external surface that is presented by the assembly is the surface of the housing itself. A small, neat assembly can thus readily be provided, and coupling of the assembly to the gas line can be effected very simply.

Although the housing and the filter element can be made virtually any shape, they are preferably substantially coaxial (and desirably generally circular cylindrical), with the first and second coupling means located at opposite ends of the housing.

Preferably the first and second flow channels are formed coaxially in the first coupling means, with the first channel innermost, and the third and fourth flow channels are formed coaxially in the second coupling means, with the third channel innermost. This is particularly advantageous where the assembly is designed to be used with a coaxial gas hose, which can thus be coupled directly and straightforwardly to the housing. Other coupling arrangements are possible even when using coaxial gas hose, but they will be of more complex construction. When the gas hose is divided other than coaxially, then the couplings may be designed accordingly. The assembly may be made to be wholly disposable but preferably the housing is openable to enable replacement of the filter element. Obviously, in the environment of an operating theatre, the highest possible standard of cleanliness for the compressed gas is essential and frequent change of the filter material will thus be recommended. Design of the assembly to accommodate a replaceable filter element is more economical than having to replace the whole of the assembly.

There are many different ways in which the housing may be designed to be openable, for example by making the housing in two axially separate parts which may be screwed or otherwise fastened together, by providing the housing with a removable end cap or by providing a door or access panel in a convenient part of the housing. Sealing means will generally be incorporated between any two relatively movable parts of the housing in order to maintain the assembled housing in a fluid-tight condition.

Desirably at least one of the coupling means has an element-receiving end lying within the housing, and the filter element has a mounting end, the element-receiving end and the mounting end being designed so that they are a push fit one on to the other to form a fluid-tight connection from the first or third flow channel to the interior of the filter element.

This arrangement particularly facilitates fitting and removal of the filter element into a housing formed as two axially separable parts.

Conveniently the element-receiving end is a cup into which the first or third flow channel opens, the mounting end is a hollow spigot receivable in the cup, and sealing means are provided on the inner surface of the cup and/or collar the outer surface of the spigot. Obviously the reverse arrangement is possible, as indeed are other formations both for the element-receiving end and for the mounting end.

In one embodiment the opposite ends of the housing and of the filter element may be substantially identical, so that the filter element may be mounted in the housing in either axial orientation. Alternatively, the element-receiving end of the first coupling means may differ from that of the second coupling means, and the mounting ends of the filter element differ one from the other, so that the filter element can be fitted into the housing in one orientation only. Filter elements are usually designed so that flow through them must be in one given direction only, and the latter arrangement will thus ensure that the element can only be fitted into the housing in the correct direction.

The coupling means can of course be made to any form that will conveniently accommodate the hose or other gas line section to which the filter assembly is to be coupled, and the whole of the coupling means may be made as an integral part of the housing. It is generally preferred, however, that at least one coupling means comprises an outer section which is integral with the housing, a separate, hollow inner section formed with the element-receiving end and means for locating the inner section substantially coaxially within the outer section and in required longitudinal relationship to the outer section. This simplifies manufacture and assembly of the equipment.

In order that the invention may be better understood, a specific embodiment of a filter assembly in accordance therewith will now be described in more detail, by way of example only, with reference to the accompanying drawings in which:

FIG. 1 is a part elevation, part longitudinal cross-section of a first embodiment of filter assembly;

FIG. 2 is a section on line II—II of FIG. 1; and

Figure 3:
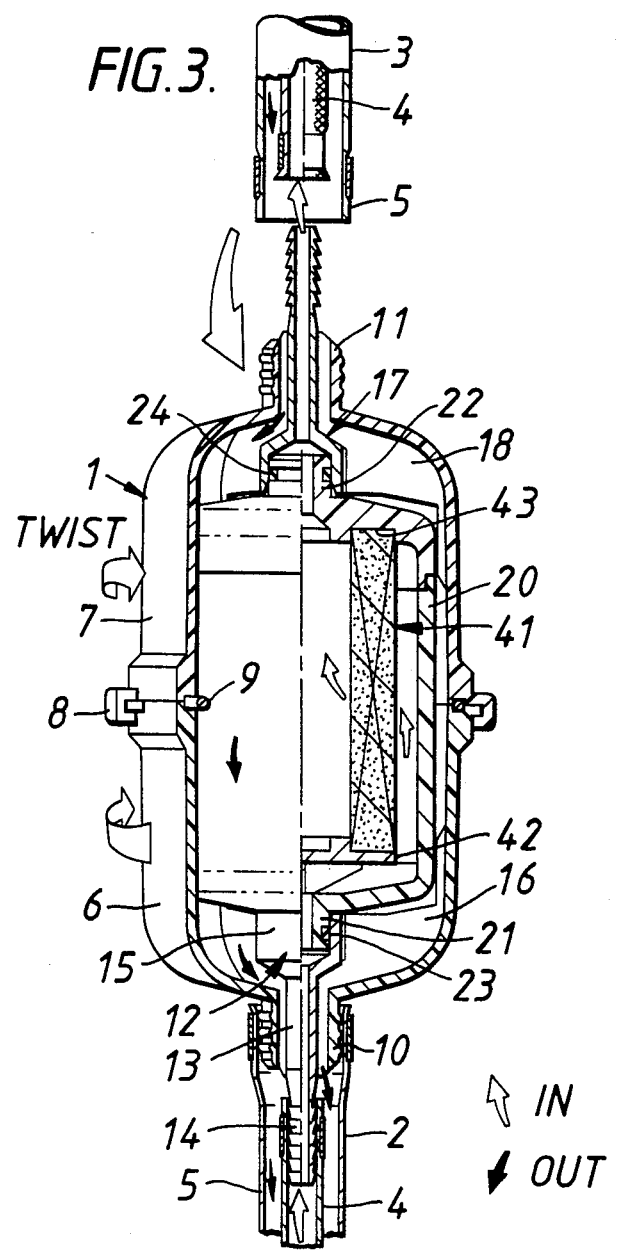
FIG. 3 is a view similar to FIG. 1 of a second embodiment of filter assembly.

Referring to FIGS. 1 and 2 these show a filter assembly 1 designed to be connected between two sections 2,3 of a hose for a compressed gas. Each section of the hose is of coaxial form and embodies an inner wall 4 within which is defined an inlet gas passage, and an outer wall 5, an outlet gas passage being formed between the inner and outer walls 4 and 5. The hose section 2 is designed for connection at its free end to a socket of appropriate form on the wall of an operating theatre, and the hose section 2 is designed to be connected at its free end to a power-operated surgical instrument.

The filter assembly comprises a fluid-tight housing formed in two axial parts 6 and 7 which may be secured together at the centre of the housing by a bayonet type coupling arrangement 8. The coupling arrangement incorporates a sealing ring 9 in order to ensure that the housing is fluid-tight when the two parts are assembled. The free end of the housing part 6 is formed with an externally ribbed spigot 10, and similarly the free end of the housing part 7 is formed with an externally ribbed spigot 11.

The spigot 10 forms part of a first coupling means, which also comprises a coupling member 12 having an elongated hollow body 13, one end of which is formed with an externally notched section 14, and the other end of which terminates in an enlarged cup 15. The coupling member 12 is located within the housing by engagement with ribs such as 16 formed on the inner wall of the part 6, space being left between adjacent ribs so that gas may flow freely therebetween.

At the opposite end of the filter assembly the spigot 11 forms part of a second coupling means similar to the first coupling means just described, and having a coupling member 17 that is similar to the coupling member 12 and that is located in the housing part 7 by ribs 18.

Each housing part 6,7 may conveniently be moulded from a suitable plastics material, and the coupling members 12,17 may be loose metal inserts into the respective housing part. Obviously other material can be used, and it would be possible to form each coupling member integrally with its associated housing part.

The assembly includes a filter element 19 that has a fluid-tight external wall 20 and that terminates at each end in a hollow spigot 21,22 respectively. In the assembled form, the spigot 21 is received in the cup 15 and is sealed by a sealing ring 23, and the spigot 22 is received in the cup of the coupling member 17 and sealed by a sealing ring 24. The interior of the filter element contains one or more filter materials as required, disposed within the filter element in any suitable manner. In the particular embodiment shown in FIGS. 1 and 2, designed for the filtration of compressed air, the filter element contains an initial layer 25 that may be of microporous borosilicate glass microfibre, a paking 26 of a molecular sieve material, a further layer 24' of porous or microporous filter paper, a layer of microporous filter medium 24a, for example a porous plastics disc and an indicator layer 25, for example a further porous plastics disc impregnated with a colour-change material. Alternatively, a layer of self-indicating silica gel may be used in place of the layers 24a and 25. It will be understood that any suitable filter combination can be used, one further example being porous plastics discs at the upstream and downstream ends of the filter element, the intervening volume being packed with molecular sieve material that has itself been treated to provide a colour change indication when it approaches saturation. A further method of incorporating colour change indication is to locate a strip of indicator material longitudinally just within the wall 20. The whole, or part of wall 20 and of housing section 7 may be of clear material so that the indicator is visible from externally of the filter element.

Rather than use molecular sieve material other granular filter materials can be utilised, for example activated carbon, activated alumina, silica gel, soda lime or a catalytic filter medium. It is also possible to use filter beds of two or more different materials arranged in series within the external wall 20, axially adjacent beds being separated by porous discs.

The wall of the filter element is desirably also of plastics material, and can conveniently be moulded in two parts, with one longer axial part being filled with the molecular sieve or other filtration material and the two parts then being spun welded or otherwise secured together.

Operation of the assembly will be apparent, and will be described in the context of supplying compressed air to a surgical instrument in an operating theatre. When in the operative form shown in FIG. 1, in-coming contaminated compressed air will flow through the inner tube of the hose section 2 and will be conducted through the hollow stem 13 and cup 15 into the spigot 21 of the filter element 19. The air will pass through the filter medium 25 which will remove any coarse contaminants, and will also coalesce and retain any small amount of oil that contaminates the air. The air will then flow through the molecular sieve material 26 which will trap any water and will also absorb gaseous contaminants, before leaving the molecular sieve material through the filter medium 24' and 24a. These media will remove any further coarse contaminant, and will prevent carry over of powder from the molecular sieve material. The gas will then flow through the indicator layer 25. If this is impregnated with silica gel then it will remain blue in colour so long as the air is of sufficient dryness, but once the molecular sieve material is no longer removing sufficient water that water will cause the silica gel in layer 25 to turn pink. If the wall 20 of the filter element is of a clear material, as is preferred, and if there is a corresponding clear section of the housing then the indicating layer is open to view and gives a warning that the filter element is exhausted and must be replaced.

Gas leaves the filter element through the spigot 22 and the coupling member 17 to the inner tube of the hose section 3 and is conveyed by that hose to the surgical instrument in order to drive this. Air returning from the instrument passes along the outer tube of hose section 3, enters the housing 6,7 through the spigot 11, passes around the external surface of the filter element and leaves the housing through the spigot 10 to pass into the outer tube of the hose section 2. It will be seen that the two air passageways formed through the housing, one through the filter element and one around the filter element are completely separate and distinct.

Once the filter element has been exhausted, or whenever a change of filter element is required in accordance with manufacturers recommendations, this can be effected extremely simply. All that is necessary is to release the bayonet connection and separate the two parts 6 and 7 of the housing, whereupon either or both spigots of the filter element will be pulled from their respective cups, as the coupling members 13,17 will be held in their position relative to the housing by virtue of the connections to the hose sections 2,3. After the filter element has been completely freed from the receiving cups, a new element is positioned in those cups, and the housing parts are re-assembled, thereby completing the location of the spigots of the filter elements in the cups. The bayonet connection is then re-fastened.

The embodiment of FIG. 1 uses a filter medium through which the gas passes axially of the filter element. FIG. 3 shows an alternative embodiment utilising a different type of filter medium within an assembly of generally similar configuration to that of FIG. 1. Accordingly, corresponding parts in FIG. 3 are given the same reference numerals as are used in FIG. 1.

In this embodiment the filter assembly is in the form of cylindrical filter element 41 extending between an end support 42 and a locating groove 43 formed in a shoulder section of the wall 20. Assembly of the filter element can be effected in any convenient manner. The filter element 41 may be one of a number of various types, and may for example be of a spirally wrapped filter medium or of a pleated filter medium. Various materials can be used for the filter medium, for example cellulose, glass microfibre, membranes of various types, or non-woven synthetic material. In the embodiment shown the flow of gas through the filter is shown as being radially inward, but it will be appreciated that filtration could equally well be effected by a radially outward flow of gas, the gas directions through the filter assembly then being reversed from those shown in FIG. 3.

It will be noted that either embodiment of the assembly positively prevents operation of equipment driven by the compressed air unless a filter element is properly positioned in the housing. If no filter element is present then there is unrestricted communication between the inner and outer passageways of the hose section 2 and the compressed gas will merely take this low-pressure drop path, rather than travel along the high-pressure drop path through the apparatus.

As shown in the drawing the coupling means at the two ends of the housing are shown designed to fit a standard termination of a coaxial compressed air hose. It will be understood that different coupling means could be provided as necessary. In particular, the coupling means at one end of the assembly could be such as to enable the assembly to be secured directly to a socket mounted on the wall of an operating theatre, so mounting the filter assembly substantially rigidly on that wall.

In either embodiment shown, either part of the housing can be secured to either hose section, and either end of the filter element can be located in either end of the housing. For proper filtration flow of compressed gas through the filter element must be in a given direction, and accordingly it is preferred that the filter element and the housing parts be marked appropriately to show the correct direction of assembly. The possibility of incorrect assembly may be reduced by making the cups 15 and 17 of different sizes and/or cross-sections, and making the spigots 15 and 22 correspondingly different. Thus, the filter element can only be assembled in one orientation relative to the housing, and as long as the housing has been properly assembled on the compressed gas hose there will be no possibility of incorrect flow direction through the filter element.

We claim:

1. A filter assembly comprising
 a fluid-tight housing,
 a first coupling means on the housing providing a first inlet channel into the housing and a first outlet channel from the housing, said first inlet channel and first outlet channel being adjacent to each other,
 a second coupling means on the housing providing a second inlet channel into the housing and a second outlet channel from the housing, said second inlet channel and second outlet channel being adjacent to each other,
 a filter element having a fluid-tight external wall, a filter inlet, a filter outlet, and filter means mounted within said external wall in a flow passage between the filter inlet and the filter outlet,
 means mounting said filter element within said housing in a location so as to define an unobstructed free space between an outer surface of said external wall of said filter element and an inner surface of said housing,
 means connecting said first inlet channel to said filter inlet and means connecting said filter outlet to said second outlet channel to establish a first flow path from the first inlet channel through the filter means to the second outlet channel,
 the second inlet channel and the first outlet channel being arranged in direct open communication with the unobstructed free space to establish a second flow path through the housing, said second flow path being unobstructed and being wholly separate from and closed off from communication with the first flow path.

2. Assembly of claim 1 wherein the housing and the filter element are substantially coaxial, and the first and second coupling means are located at opposite ends of the housing.

3. Assembly of claim 1 wherein the first inlet channel and the first outlet channel are formed coaxially in the first coupling means, with the first inlet innermost, and the second inlet channel and second outlet channel are formed coaxially in the second coupling means, with the second outlet channel innermost.

4. Assembly of claim 1 wherein the housing is openable to enable replacement of the filter element.

5. Assembly of claim 1 wherein at least one of the coupling means has an element-receiving end lying within the housing, and the filter element has a mounting end, the element-receiving end and the mounting end being designed so that they are a push fit one onto the other to form a fluid-tight connection from the first inlet channel or second outlet channel to the interior of the filter element.

6. Assembly of claim 5 wherein the element-receiving end is a cup into which the first inlet channel or second outlet channel opens, the mounting end is a hollow spigot receivable in the cup, and sealing means are provided in the region between the inner surface of the cup and the outer surface of the spigot.

7. Assembly of claim 5 wherein opposite ends of the housing and of the filter element are substantially identical.

8. Assembly of claim 5 wherein opposite ends of the housing are substantially identical, but the element-receiving end of the first coupling means differs from that of the second coupling means, and the mounting ends of the filter element correspondingly differ one from the other.

9. Assembly of claim 5 wherein said at least one coupling means comprises an outer section which is integral with the housing, and a separate, hollow inner section formed with the element-receiving end, and means for locating the inner section substantially coaxially within the outer section and in corresponding longitudinal relationship to the outer section.

* * * * *

UNITED STATES PATENT AND TRADEMARK OFFICE
CERTIFICATE OF CORRECTION

PATENT NO. : 4,786,298

DATED : November 22, 1988

INVENTOR(S) : Colin T. Billiet et al.

It is certified that error appears in the above-identified patent and that said Letters Patent is hereby corrected as shown below:

Claim 3, line 7, after "inlet", insert --channel--.

Signed and Sealed this

Second Day of May, 1989

Attest:

DONALD J. QUIGG

Attesting Officer

Commissioner of Patents and Trademarks